(12) United States Patent
Gentil et al.

(10) Patent No.: US 7,334,119 B2
(45) Date of Patent: *Feb. 19, 2008

(54) METHOD, SYSTEM, APPARATUS, AND PROGRAM PRODUCT FOR TEMPORARY PERSONALIZATION OF A COMPUTER TERMINAL

(75) Inventors: Gregoire Alexandre Gentil, Mountain View, CA (US); Alireza Malekzadeh, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/599,884

(22) Filed: Nov. 14, 2006

(65) Prior Publication Data

US 2007/0113069 A1 May 17, 2007

Related U.S. Application Data

(63) Continuation of application No. 10/626,367, filed on Jul. 23, 2003, now Pat. No. 7,162,628.

(51) Int. Cl.
G06F 9/00 (2006.01)
G06F 9/24 (2006.01)
G06F 15/177 (2006.01)
G06F 1/24 (2006.01)

(52) U.S. Cl. .......................................... 713/1; 713/100

(58) Field of Classification Search .................... 713/1, 713/100; 707/204; 709/217; 717/178
See application file for complete search history.

(56) References Cited

U.S. PATENT DOCUMENTS

| | | | | | |
|---|---|---|---|---|---|
| 5,740,364 | A | * | 4/1998 | Drerup | 709/217 |
| 6,110,229 | A | * | 8/2000 | Yamaguchi | 717/178 |
| 6,151,608 | A | * | 11/2000 | Abrams | 707/204 |
| 6,161,176 | A | * | 12/2000 | Hunter et al. | 713/1 |
| 6,370,646 | B1 | * | 4/2002 | Goodman et al. | 713/100 |

* cited by examiner

Primary Examiner—Thomas Lee
Assistant Examiner—Michael Wang
(74) Attorney, Agent, or Firm—Hickman Palermo Truong & Becker LLP

(57) ABSTRACT

A method, system, and program product that enables a computer user to access their own complete computer environment and software on a separate and distinct host computer. The visiting user's data including files, settings, environment, software, are all packed in a single file.

20 Claims, 8 Drawing Sheets

METHOD, SYSTEM, APPARATUS, AND PROGRAM PRODUCT FOR TEMPORARY PERSONALIZATION OF A COMPUTER TERMINAL

CROSS-REFERENCE TO RELATED APPLICATION

This application is a continuation of and claims priority of U.S. patent application Ser. No. 10/626,367 entitled METHOD, SYSTEM, APPARATUS AND PROGRAM PRODUCT FOR TEMPORARY PERSONALIZATION OF A COMPUTER TERMINAL, filed by Gentil, et al. on Jul. 23, 2003, now U.S. Pat. No. 7,162,628, the entire contents of which are incorporated herein by reference as if originally set forth herein.

FIELD OF THE INVENTION

The invention relates to hardware, software, apparatus, and methods for customizing or personalizing computer system hardware and software resources, and protecting system hardware, software, or data in order to personalize the resources for a guest user. This includes establishing guest user friendly operating parameters or data for a computer, such as, allocating extended or expanded memory, specifying device drivers, paths, files, buffers, disk management, etc.; after initial "boot" to accommodate a new user by changing system settings or operational modes to accommodate the visiting user after the settings and operational modes have been previously set or initialized. This would include changing system data orientations and device configurations, system settings, parameters, or operational modes that have been previously set or initialized.

BACKGROUND OF THE INVENTION

Users have more and more computing devices today. Their data, profile settings and applications are spread across a large number of computing devices: Work PC, Home PC, PDA, Tablet PC, shared PC (cybercafe, university, etc.). They have a hard time keeping control of their information. This is because of such factors as:

The sheer multiplicity of computing devices creates great confusion,

Data is scattered among various devices with difficult synchronization,

Total cost of ownership is increased.

In this context, the PC has become a commodity. It is very easy to access a PC whether at work, home, a friend's place, and even as shared resources at a cybercafe, an airline lounge, etc. The USB port is now available on pretty much all computers. Most commodity operating systems include USB drivers by default. It is now easy to have a portable mass storage device, carry it around and plug into any machine using the USB port (or another connection). Plug and play portable mass storage devices are now a reality.

As the complexity grows, there are a number of possible answers to the question "how do I manage my data across all my computing devices?"

2-way data synchronization software such as those developed by Pumatech use of a removable storage device such as those manufactured by Iomega, DiskOnkey, etc, storage of data on a centralized server such as Xdrive or the Microsoft.Net My Services initiative, remote access to main computer using tools such as GoToMyPC or Symantec PcAnywhere, But these existing solutions do not offer a comprehensive and complete solution to user's data management. This is because the existing solutions are based on 2-way synchronization software. These solutions are focused on specific data types and are designed to synchronize that data between a PDA (like a Palm) and a PC's PIM (personal information manager) application. The realm of possibilities is somewhat limited. For example, using Palm's HotSynch manager, you will be able to only synchronize data between the Palm Desktop application on your PC and your Palm handheld device. You will not be able to act on Microsoft Word documents.

Another set of existing solutions is based on removable storage. These solutions are hardware-only. The manufacturer delivers a hardware device with the appropriate device drivers so that the operating system recognizes it. The device appears as a separate disk drive within the commodity operating system. To use these devices, a user will need to manually copy files from the hard drive to the device. There is no complete software solution allowing people to efficiently manage their data, profile settings and applications. The device is purely hardware and everything needs to be done by hand by the user.

Still another set of solutions are based on remote storage. In the solutions based on remote storage, two types of problems appear. The first is a privacy issue. That is, as data is stored on a remote storage space, the solution raises many, privacy issues. The user will have to trust a third party to host his information on its servers. Privacy is a major issue and consumers are still waiting for a solution that will make them feel comfortable in their online interactions: 54% because the site requires it 43% because they don't want to be solicited 30%. Because they do not trust the site 22% to save time 17% to get personalized services.

This is related to the issue of registering on websites, and why many online users do not register on websites. It appears that consumers are waiting for a solution that will make them feel comfortable in their online interactions and let them reap the full benefits of online registration and centralized data sources Because users have no control how their personal information is saved and shared by vendors, consumers aren't ready to trust online centralized information services in exchange for ease of use. Second, these solutions require remote network access to the storage space and that raises a bandwidth issue. Bandwidth is a real problem: the comparison of Moore's law for CPU, storage and bandwidth shows that the growth of CPU power and storage outrank that of bandwidth in a great way.

The last mile connection to the household is a real bottleneck for network access. Bandwidth growth rates are far below those of CPU and storage capacities. Furthermore, even with high speed network access, download times for large files remain still much greater than local storage device access times—network data transfer can not compete with physical connections for large files: Today, for example, presentation files can grow over 10 MB and Outlook files will be over 100 MB. Transfer time from a centralized server is painful and inconvenient. Note: Elapsed times are for download connections. Upload data transfer rates are usually much lower than download transfer rates. Even with a large bandwidth access, the gap to access a 10 MB file stored on physical device or on a remote server is considerable. Even with important bandwidth access, network data transfer is not very efficient and can not compete with physical connections for large files.

Finally, penetration of high-speed network access is still very low. Only a small portion of Internet connections is high speed today. At current rates, less than 30% of US households will have high speed Internet connection by the year 2005. And this will be the most advanced market worldwide. ADSL and cable connections are still early adaptor markets.

Remote access has other problems. First there are bandwidth issues similar to the problems outlined just above about centralized storage spaces. In addition, the main computer should always be accessible: either switched on or all of its contents cached. Both possibilities are inconvenient and economically inefficient.

For any user, solving those headaches becomes a priority. They see the real value in the data, not where or how it is accessed. They want to read their email, work on the latest version of their presentation, write a memo or file their expense report. It is important for users to always be able to work on their data using the software they are accustomed to

SUMMARY OF THE INVENTION

"My Companion" is a powerful solution that allows users to truly roam from one computer to another with maximum efficiency and ease. "My Companion's" intelligent interface will find and gather all the important information for a given user. As a result, it will virtualize and load their profile settings, data files, software, and security certificates into a unique file. That file can be shared on a network or loaded on a small mass storage device.

"My Companion" includes a method, a program product, and an apparatus, all characterized in that they transfer device settings from a persistent memory device (as a flash memory card, a PCMCIA card, a CD-ROM, or even a secure server) to a target computer. This is accomplished by storing data relating to the target computer in the persistent memory device, and, when initiated by an end user or the target computer, transmitting the data relating to the target computer from the persistent memory device to the target computer. This is followed modifying settings on the target computer in response to the transmitted data to recreate a work environment.

Generally, the data relating to the target computer is chosen from the group consisting of software to facilitate downloading from the persistent memory device to the target computer, user profile information (as network settings, access authorizations, passwords, PINs, preferences, personalization, and the like), application software (including personalization and preferences), user and application data files; and project files.

As a general rule the downloads relating to the target computer comprises software to facilitate modifying settings on the target computer, such as script files to operate on software on the target computer or to install software on the target computer, including to operate on registry files on the target computer.

Alternatively, the data relating to the target computer may be uninstall software and garbage collection software, for example, to facilitate restoring settings on the target computer, such as restoring registry files on the target computer.

The downloaded profiles may contain network connection data, access files, passwords, and PIN numbers.

The persistent storage may be various hardware embodiments recognized by the operating system as a disk drive or mass storage or a network asset.

Accessing the unique file through the network or using the mass storage device and connecting it to any computer, users will still be able to always access their own complete environment and software. In addition, they will be able to benefit from the resources of the host computer they are connected to (Internet connection, printer access, etc.). The technology can be easily spread across the enterprise and comprises a server module allowing IT to centrally manage the distribution and use of the end user devices. User's data including files, settings, environment, software, all packed in a single "My Companion" file.

The total "My Companion" environment includes the Main user's Computer, the User's work computer, the "My Companion" file, which can be transferred by email, FTP or put on any network drive or removable device, the User's home computer, and, possibly, a PC in a cyber café or a friend's PC.

According to the method, system, apparatus, and program product of our invention, any computer can Create a "My Companion" File and load all necessary data (profiles, preferences, favorites, files, settings, . . . ), Use data from the Companion File on another computer as if it were on the initial computer, and use a 2-way synchronization to update data.

As a result of this architecture:

The complete virtualized environment is packed into a unique file. This file can be easily moved around and shared (through the use of removable mass storage devices or shared network drives or even transferred over standard networking protocols), The easy sharing of a unique file makes it possible for corporate users to create and distribute virtualized workplaces.

The unique file is actually a set of wizards and scripts, plus preferences, favorites, passwords, identifiers, networks identifiers, PIN numbers, and data files, typically within a directory. The scripts and wizards facilitate "cloning" the user's computer to the temporary while the user is temporarily using the target computer, and then uninstalling the preferences, favorites, passwords, network identifiers, PIN numbers, data files, and the like, to return the target file to its original state.

One aspect of the method, system, and program product of our invention is the hardware/software independence. Specifically, our technology is an embedded software driven solution, and is independent of the hardware of the target system.

Users can load their complete environment into a "My Companion" file and that file can be shared using network resources (put on a network share, transfer via FTP or even by email). Users can also load the "My Companion" file onto a removable mass storage device. The mass storage device used is commodity hardware that can be bought in any retail computer store. Examples of hardware solutions include:

The combination of an IBM micro drive and a standard flash card reader with a USB interface, The combination of a flash card and a standard flash card reader with a USB interface, A portable hard disk drive with a USB interface such as the Iomega portable hard drive or the Lacie USB PocketDrive.

THE FIGURES

Figure 4:
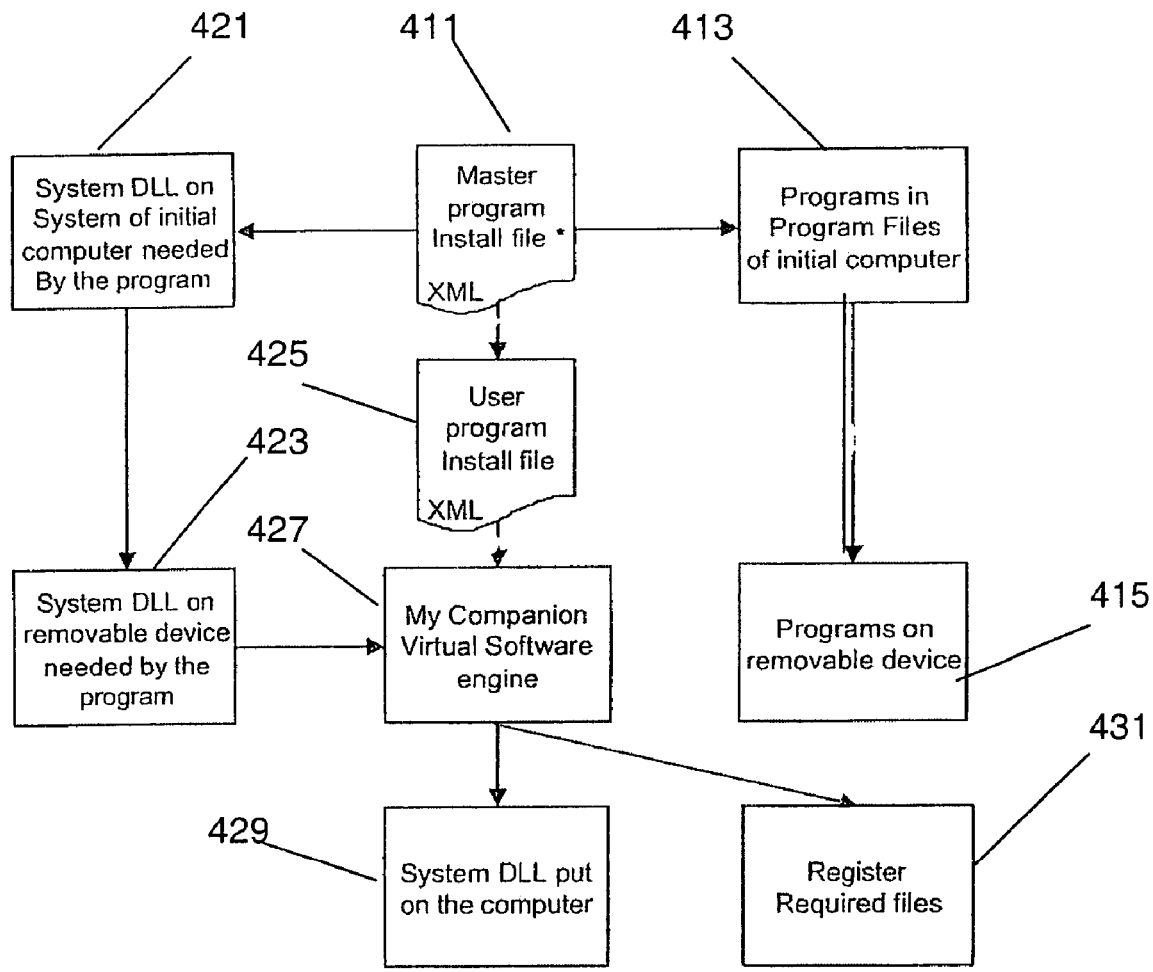

FIG. 4 illustrates a flow chart for the virtualized software installation method of the invention, with a Master Program Install File (including scripts and wizards for installing, instantiating, and uninstalling after use), 411, programs in the program files of the user's original computer, 413, which are loaded to the removable device, 415. The software installation method also has the system DLLs and specific drivers of the user's original computer, 421, which are copies to the removable device, 423. The user program install file, 425 (with scripts, wizards, and uninstall tools), through the "My Companion" Virtual Software engine, 427, writes the required system DLLs and drivers to the temporary computer 427, and registers the required files, 431, in the registry of the target or temporary computer.

Figure 5A:
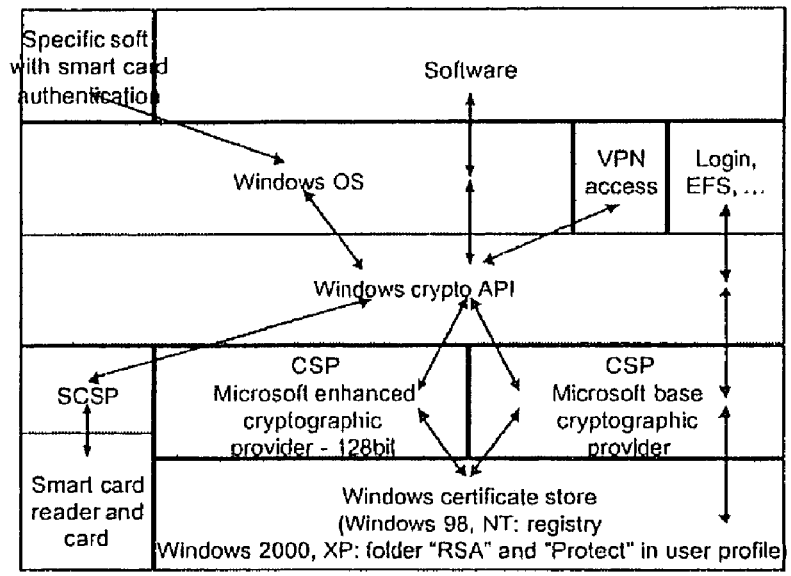
Figure 5B:
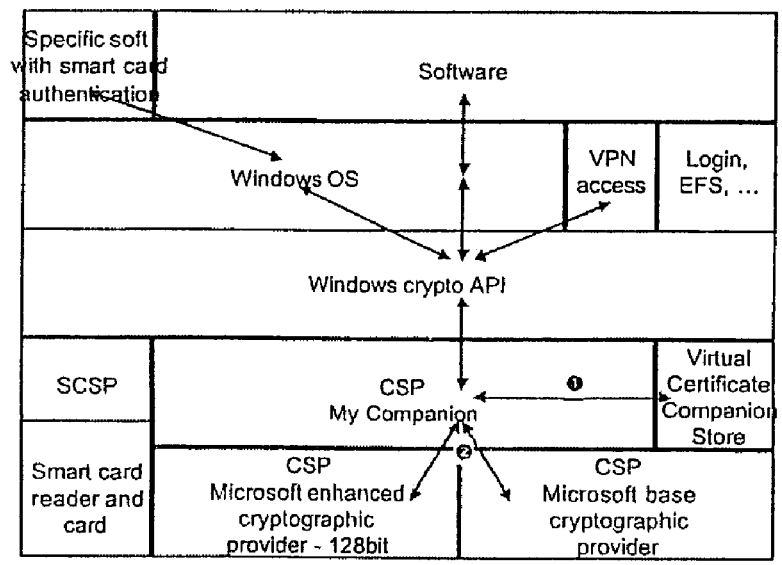

FIGS. 5A and 5B illustrate a comparison of the authentication schemes of Microsoft Windows and of the method, system, and program product of our invention.

Figure 6:
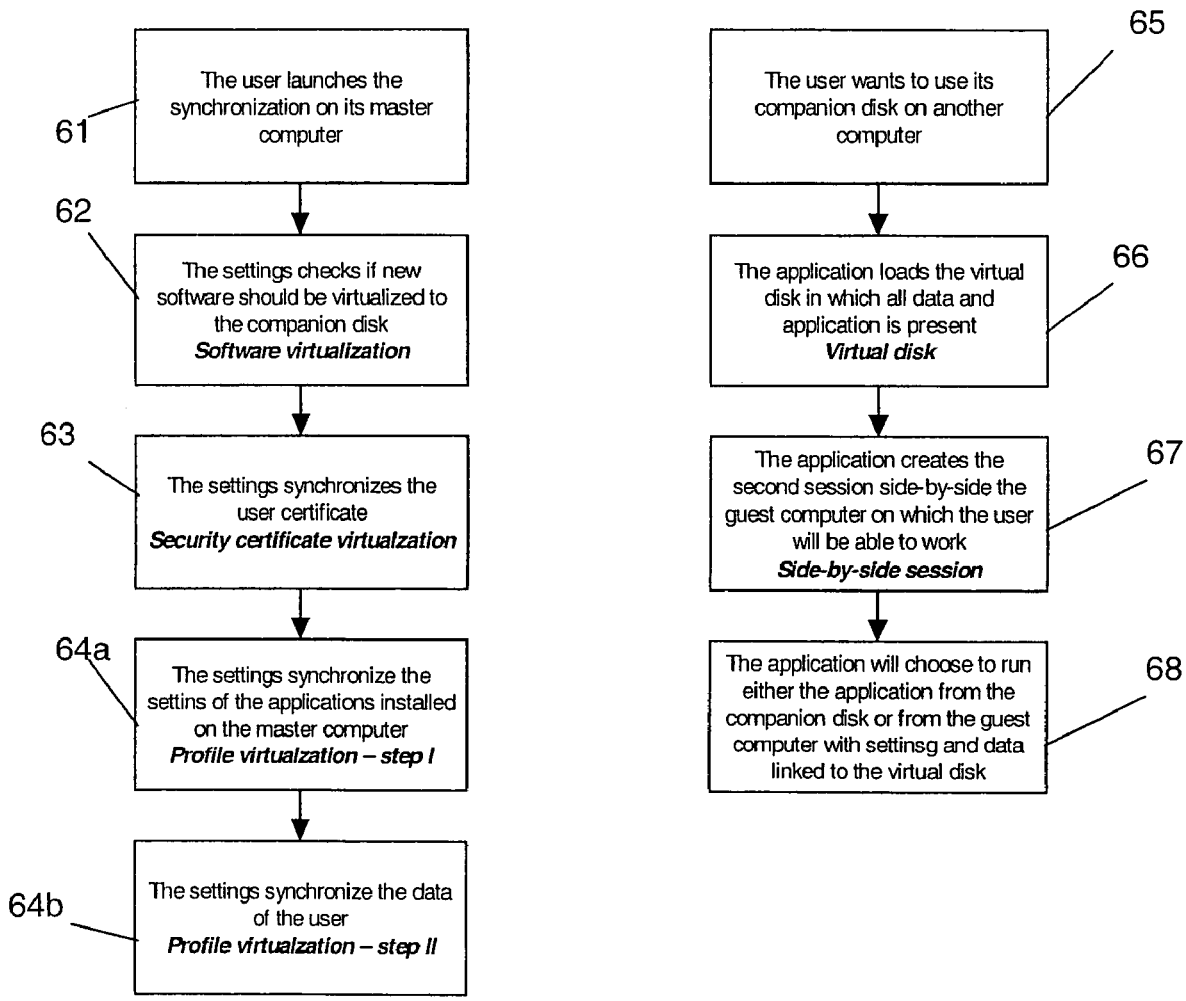

FIG. 6 illustrates the various modules called and used in two scenarios, the first where the user launches synchronization on his or her master computer, and includes software virtualization, security certificate virtualization, and a two-step profile virtualization. In the second scenario the user uses his companion disk on another computer, which involves a virtual disk processing which the application loads the virtual disk onto the target computer, next where the "side-by-side" session is created on the guest computer, and finally, running the desired applications either from the guest computer or the companion.

Figure 7:
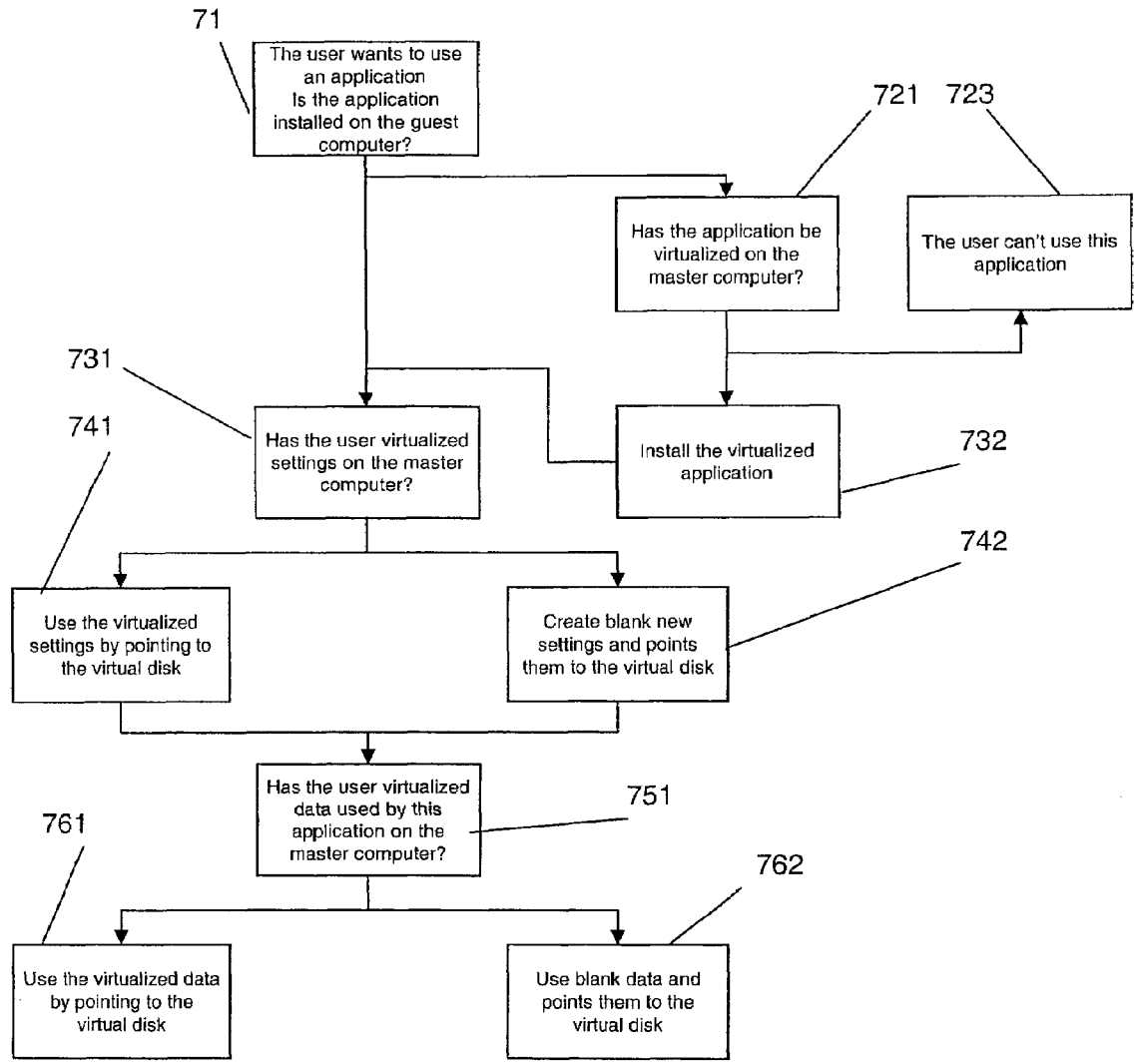

FIG. 7 is a flow chart illustrating how the sessions are triggered and run.

Figure 8:
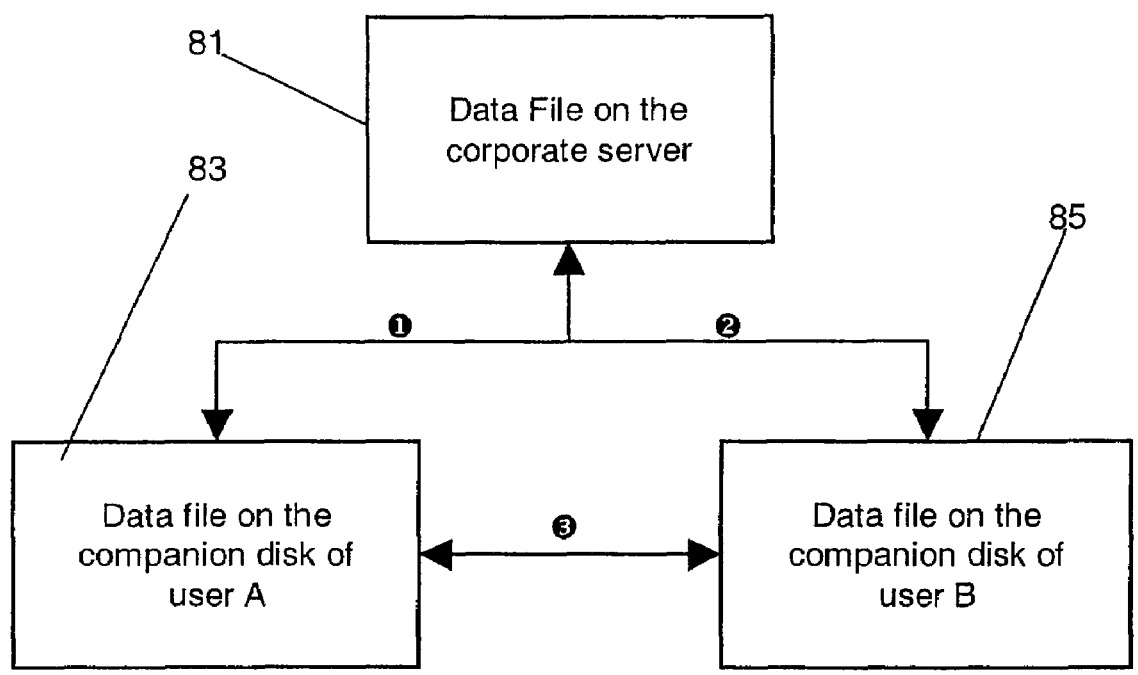

FIG. 8 illustrates synchronization between a server and companion disks.

DETAILED DESCRIPTION OF THE INVENTION

By having a unique portable file contain all the data files, user settings, templates, scripts, wizards, applications, data files, uninstall wizards, and uninstall scripts, "My Companion" allows a complete encapsulation of a given work environment. A user will therefore be able to create a specific "My Companion" file and share it with another user. This capability allows users to build work environments and share them across various machines with other people who will need to work on the same set of documents, contact information, email messages, applications, etc.

The "My Companion" technology allows for intelligent sharing and synchronization of the work environments between the various users. An administrator creates a work environment as a "My Companion" file and shares it with other users across the enterprise. In this way, users are able to access all the relevant information, settings and applications contained within the file.

Figure 1:
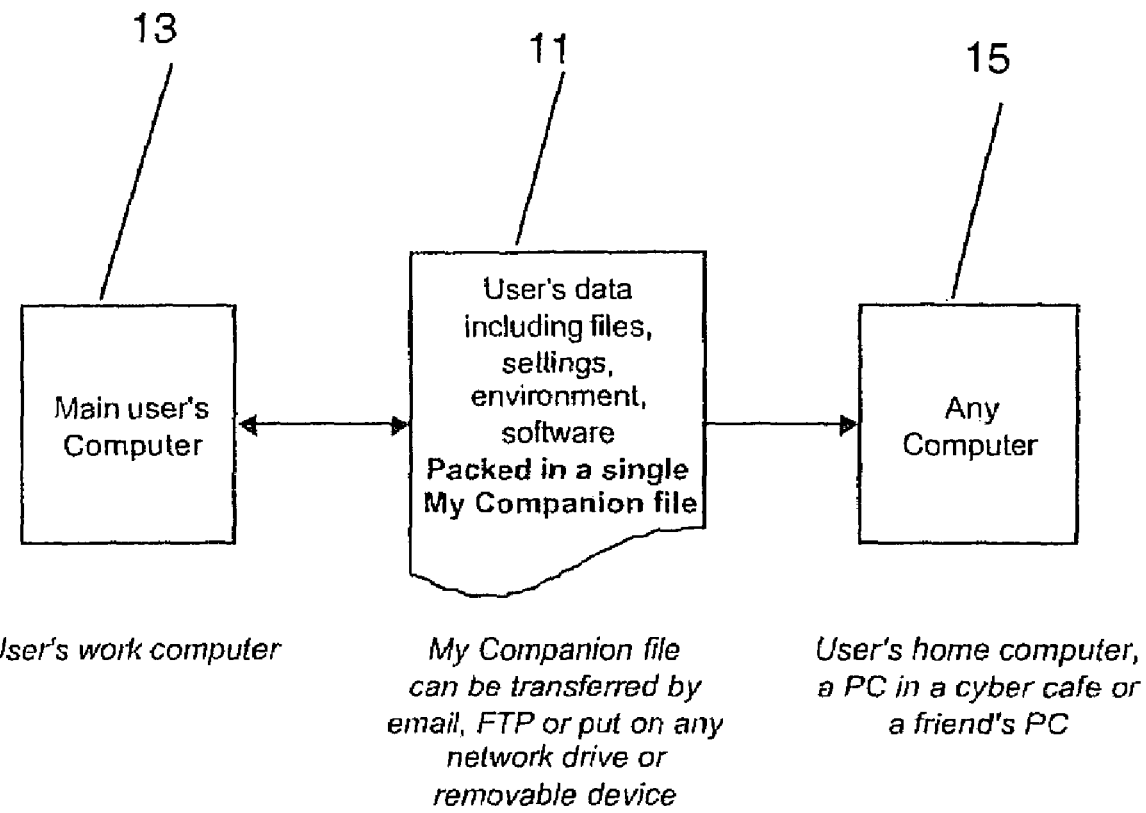
FIG. 1 illustrates an embodiment of the invention where a "My Companion" file is created and loaded with data of interest (as profiles, files, settings, personalizations, customizations, and the like, as well as scripts and wizards), and the data from the "My Companion" file is transferred to another computer and then uninstalled after temporary use.

FIG. 1 illustrates an embodiment of the invention where a "My Companion" file, 11, is created and loaded with data of interest (as profiles, files, settings, personalizations, customizations, and the like). The data from the "My Companion" file is transferred to another computer, 13, and updates are transferred back to the user's computer 13, and to another computer, 15.

Figure 2:
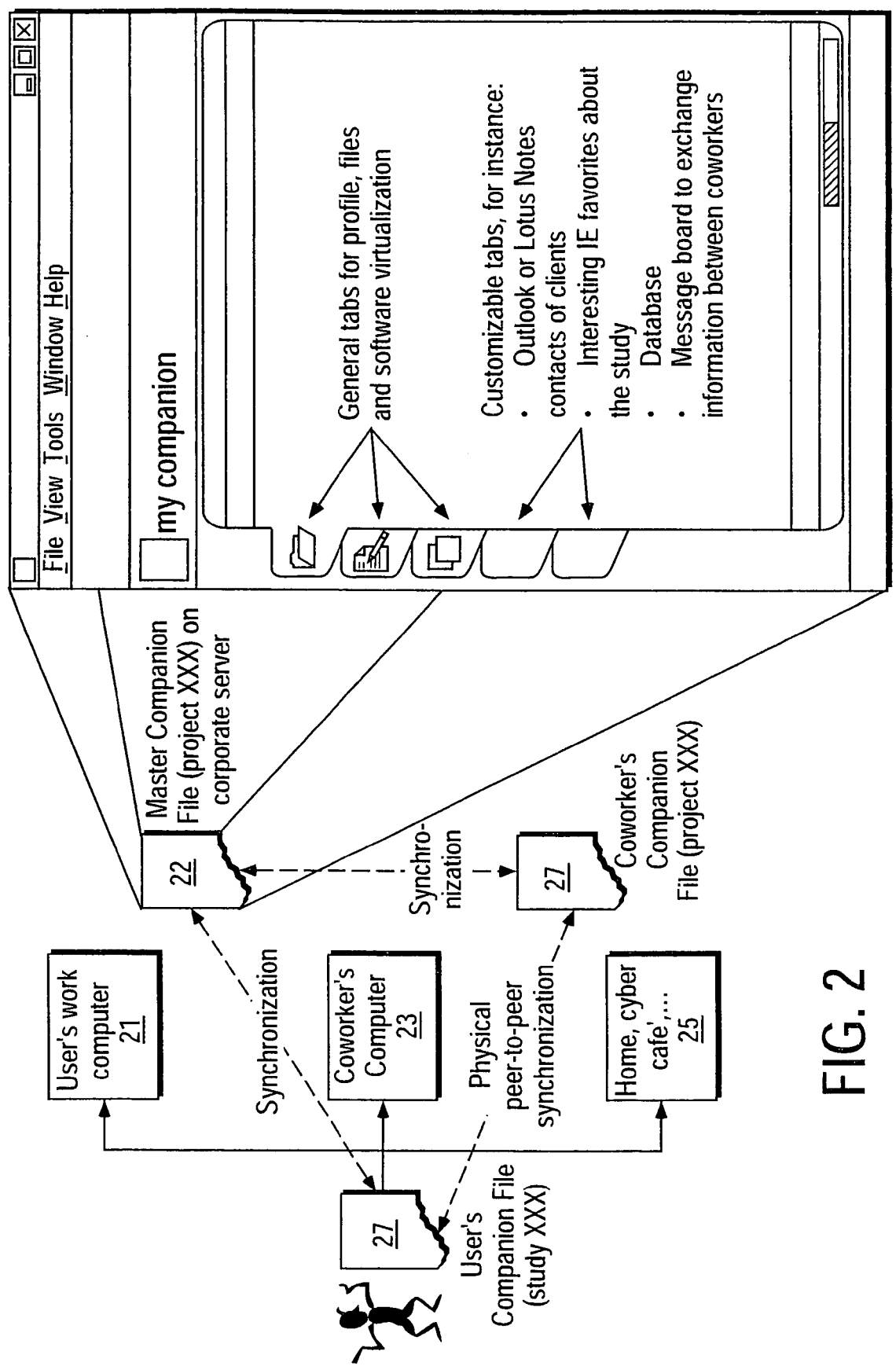
FIG. 2 illustrates the one file unifier concept of our invention, with the user's Work Computer, 21, with "My Companion" software, 27, a Coworker's Computer, 23, with a coworker's "My Companion" software, 29, and an optional (home, cyber café, or the like) computer, 25, along with a master "My Companion" file, 22 on the corporate server, and a Coworker's "My Companion" File.

FIG. 2 illustrates the one file unifier concept of our invention, with the user's Work computer, 21, with the user's "My Companion" file, 27, the Coworker's computer, 23, with the co-worker's "My Companion" file, 24, and an optional computer, 25, for example, at home, in a cyber café, or the like. The Figure also illustrates a master companion file, 22, on the corporate server.

FIG. 6 illustrates the various modules called and used in two scenarios, the first where the user launches synchronization on his or her master computer, 61, and includes software virtualization, 62, security certificate virtualization, 63, and a two step profile virtualization, 64a and 64b. In the second scenario the user uses his companion disk on another computer, 65, which involves a virtual disk process, 66, in which the application loads the virtual disk onto the target computer, next the "side-by-side" session is created on the guest computer, 67, and finally, the desired applications are run either from the guest computer or the companion, 68.

FIG. 7 is a flow chart illustrating how the sessions are triggered and run. The logic is as follows:

Is an application present on a guest computer, 71? If not, can the application be virtualized and delivered to the requester, 721. If not, 723, that is the end. If it can be virtualized, it is virtualized for installation, 732.

Next virtualized settings are searched for, 731, and created if not present, 742. or instantiated if present, 741. The logic is; has the user virtualized data used by this application on the master computer, 751. If so, it is used, 761. If not, blank data is used and pointed to the virtual disk, 762.

FIG. 8 illustrates synchronization between a server and companion disks, where data is moved between the data files on a server, 81, on a companion disk of user A, 83, and on a companion disk of user B, 85.

The Master "My Companion" File, 22, on the corporate server is joined to the to the users work computer, 27, and to the co-worker computer, 21, through various synchronization means, shown as Synchronization, which may be Physical peer-to-peer synchronization, or other Synchronization protocols.

The Master "My Companion" file, 22, on the corporate server includes, for example, general tabs for profile, files and software virtualization, Customizable tabs, for instance for:

Microsoft Outlook or Lotus Notes contacts of clients
Interesting IE favorites about a current study or project, Database
Message board to exchange information between coworkers.

Under the One Filer Unifier concept, the "My Companion" File is the up-to-date virtualized workspace, gathering all information about the project by integrating data in its original proprietary format and having software available.

Using the method, system, apparatus, and program product described herein, a user is able to tag individual or groups of files, settings, email messages and/or applications. Elements are tagged individually or through a user-friendly wizard interface. Rules on file or information type are set and used. All tagged elements are encapsulated within a new "My Companion" file. That file, which we refer to as a "Unique File" and equivalently as a "My Companion File" contains a complete work environment with related elements of different types, that is, the data files, tools, scripts, and wizards to create the complete work environment on the target computer, and to remove it when no longer needed. The newly-created file can then be published by the author. Other users who have been granted rights by the author are also able to access it and open it on their own machine.

Users are able to work using the elements that have been encapsulated. Based on the rights given to each by the author, they are able to read, modify or delete elements or add new ones to the work environment as defined by the author. They could also be allowed to copy elements from their own work environment to the encapsulated one and vice versa.

"My Companion" also allows intelligent synchronization between the various users and/or the author.

An author is able to assign his/her rights as the author to another designated user. That user will then be given all the rights that the original author had.

General Architecture

The general architecture provides for the ability to synchronize the "My Companion" file between different locations.

A "My Companion" file is composed of different elements:

- The "My Companion" software (to allow for the ability to run everywhere and not require additional software on a CD when running for the first time on a new machine).
- Profile information
- Software applications
- Data files
- Project files The "My Companion" software remains within the file. It can be updated manually or through a server module that detects previous versions and updates them.

The profile information and data files are subject to intelligent 2 way synchronization between the Companion file and the user's main computer.

The software will be virtualized and installed from the user's computer (or a networked server) into the Companion file.

The project files will be subject to 2 way intelligent synchronization between the user's main computer (master copy) and either a Companion file or another location on the corporate network where other users will be able to access it. In case a given element within the project portion is modified by two or more users at the same time, the intelligent synchronization process is able to capture that information and submit the various modifications to the project administrator. The administrator will be able to approve any such modification.

Figure 3:
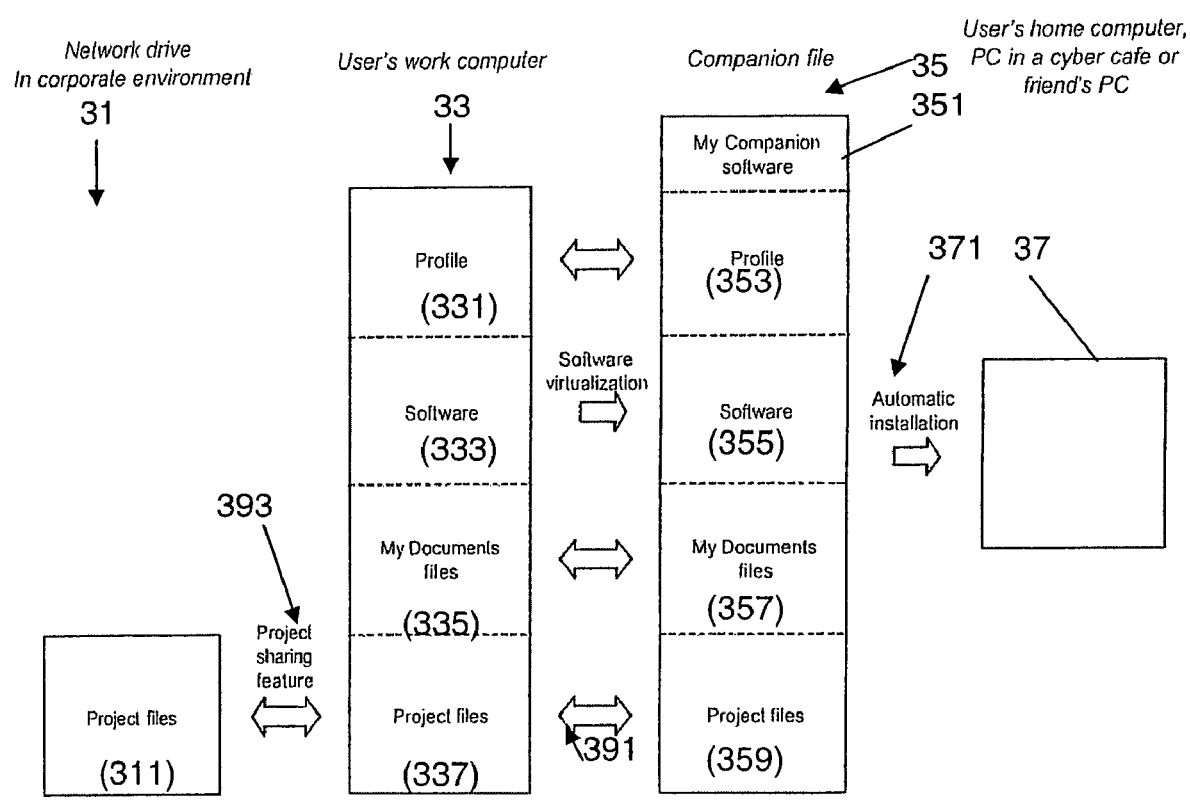
FIG. 3 illustrates the relationship between the network drive, 31, in a corporate environment, the user's work computer, 33, the Companion file, 35, and, for example, the user's home computer or a PC in a cyber café or even friend's PC, 37.

FIG. 3 illustrates the relationship between the network drive, 21, in a corporate environment, the user's work computer, 23, the Companion file, 25, and, for example, the user's home computer or a PC in a cyber café or even friend's PC, 27.

The network drive, 31, includes project files, 311.

The user's work computer, 33, includes a profile, 331, software 333, My Documents files, 335, and project files, 337.

The companion file, 35, includes the "My Companion" software, 351, the user's Profile, 353, other software, 355, the user's document files, 357, and the user's project files, 359.

Automatic installation, 371, is provided to the user's home computer, 37.

Software virtualization 391 between the computers and files, as is a project sharing feature, 393.

To allow for the feature set of this complex architecture, the technology calls a number of internal modules or building blocks, as will be described herein below:

- Software virtualization,
- Security certificate virtualization,
- Profile virtualization,
- Virtual disk,
- Privilege granting.

Software Virtualization

Software virtualization enables embedding of software into the companion file. By software virtualization, software can be installed directly into the "My Companion" format and run from it.

This provides the ability to run software applications directly from removable mass storage devices connected to a computer without installing it on the computer itself. This avoids writing software applications to the guest or target computer.

Users are therefore able to carry their applications around with them and run them from guest computers they connect to.

In order to virtualize software and install it in the "My Companion" file, it is necessary to understand its complete installation process. A two-step process is used to properly install and run the application. Finally, a clean up mechanism makes sure nothing is left on the guest computer where the application is run.

An installation monitor is provided in order to gather the required information and be able to install a given application in the "My Companion" file. The virtualized software installation is built around a software virtualization engine, 427 that monitors the complete install process of an application on a normal Windows desktop environment. This engine, 427, is designed to monitor the install process for a given application and track the location of the application files, the system files (DLLs), and the modifications of the system registry. At the end of the monitoring process, the engine will generate an XML file. This summary file will be the basis for the next part of the software virtualization.

The software virtualization process to install and run an application from the "My Companion" file (on a removable mass storage device or a network shared drive) is as shown in FIG. 4.

- Step 1 is performed once only, at initial install time: at the time when the application is first installed in the "My Companion" file, e.g., on the removable, portable storage device.
- Step 2 is performed each time the application is run: when and each time the application is run from the "My Companion" file.

Programs are on a removable device, as a flash memory, a PCMCIA card, a microdrive, or the like.

System DLL files needed by the program, 421, are also on the removable device.

A user program Install file (typically XML), 425 contains the scripts and wizards to install the software on the target computer.

My Companion Virtual Software Engine, 427, puts the System DLL files on the target computer, 429, and Registers the required files, that is, it makes the required registry entries on the target computer, 431.

The Master program Install file (typically an XML file), 411, is a collection of scripts and wizards that instantiates downloading and installation of required dll's, 423, program files, 413, and the user program install file, 425.

Step 1 is carried out at initial install time. After the installation monitoring engine has done its job, the output is an XML file that will contain the valuable location information (executable files, system files and registry entries). This XML file is called the Master program install file.

Using this master program install file, 411, as the starting point, the program files, 413, and the DLLs, 423, on the initial computer are copied to the "My Companion" file. In parallel, a user program install file is generated. This file will contain the registry keys that will be needed by the software application to run properly.

Step 2 is carried out each time the application is run. Specifically, after the initial installation as described above, the user will be able to run the software application directly from the "My Companion" format on the guest computer. When the user tries to launch the application, a small number of events happen to allow for the execution directly from the "My Companion" format.

Using the user program install file, 425, as the information source and starting point, the "My Companion" Virtual Software engine, 427, will copy all the required system DLL files, 423, to the guest computer system, 429, registers them if needed, and updates all required registry entries, 431.

Then, the software application located on "My Companion" can run as if it were on a local disk on the target computer. The software files are executed directly from the mass storage device or network shared drive where the "My Companion" file is located. Only a small number of system DLL files and registry entries need be actually copied to the guest or target computer.

System clean up is initiated when the user is finished using the application and chooses to close it. The added registry keys and the DLL's installed onto the computer are deleted. This clean up process makes sure that no information is left behind on the guest computer.

The system clean up is an automatic process and does not require any user intervention. It guarantees a clean use of the guest computer and will avoid those important registry settings, such as a possible license key, be left behind by the user.

Security Certificate Virtualization

A further aspect of the method, system, program product and apparatus of our invention is the security certificate virtualization. This enables the embedding of security certificates into the companion file and use of them on other computers than the user's main computer.

By loading the "My Companion" file onto a removable mass storage device, users are able to carry their security certificate with them and use it from various computers simply by plugging the removable mass storage device to it. Alternatively, if the "My Companion" file has been loaded on a new computer through a network drive share, the end result are the same and the user will be able to use the security certificate on the new machine.

This allows for secure authentication when roaming from machine to machine. It is pretty similar to having a hard token like a smart card except that the technology allows for security certificates to be tied to the Companion file rather than the user's computer's hardware.

FIGS. 5A and 5B show a comparison of the technical architecture of the Microsoft® user authentication process and the user authentication process of the method, system, program product, and apparatus of our invention.

Authentication On MS Windows, as shown in FIG. 5A, which illustrates the current situation under Microsoft Windows NT 4, Windows 2000 or Windows XP.

When an application needs authentication, it calls the Windows' cryptographic API. That API is in charge of all security related tasks.

Encryption algorithms are not actually implemented in the API but in a CSP (cryptographic service provider), which is physically a signed DLL. Microsoft ships Windows with one standard CSP, the Microsoft base cryptographic provider.

Usually, the cryptographic API calls the algorithms from the CSP indirectly. The authentication or other security related task is accomplished when the data passes through the API (for example encrypting plain text or decrypting data to a plain text format). During that process, the user's security certificates are read from the "Windows certificate store".

It has to be noted that Microsoft gives the opportunity to replace the standard CSP by a custom CSP.

The virtual authentication of the method, system, program product, and apparatus of our invention is illustrated in FIG. 5B. The figure illustrates a customized CSP and the ability to replace the Microsoft CSP by a custom one.

When receiving a job from the API, our customized CSP will pass the job to the Microsoft CSP. The data will have been passed through the API and the certificate stored in the "Companion certificate store" will have been used.

With this architecture, it is possible to use the cryptographic API with the security certificate stored not in the standard repository corresponding to the logged user but in a specific location corresponding to another user.

This architecture is very portable and has the added advantage not to add yet another encryption algorithm to the mix. The encryption and decryption algorithm used is that of Microsoft. The encryption/decryption job is done by the standard Microsoft CSP with the exception of the use of a security certificate from a new location.

The custom CSP is able to manage both the authentication of the current user by simply redirecting all requests to the current CSP and the authentication of another user by using the certificates located in the Companion certificate store.

CSP Implementation

Our custom CSPs will support all of the following DLL entry points:

CPAcquireContext
BOOL CPAcquireContext(
HCRYPTPROV*ph Prov,
CHAR* pszContainer,
DWORD dwFlags,
PVTableProvStruc pVTable);

The CPAcquireContext function acquires a handle to the key container specified by the pszContainer parameter.

CPCreateHash
BOOL CPCreateHash (
HCRYPTPROV hProv,

ALG_ID Algid,
HCRYPTKEY hkey,
DWORD dwFlags,
HCRYPTHASH* phHash);

The CPCreateHash function creates a hash object and initiates the hashing of a stream of data.
CPDecrypt
BOOL CPDecrypt (
HCRYPTPROV hProv,
HCRYPTKEY hkey,
HCRYPTHASH hHash,
BOOL Final,
DWORD dwFlags,
BYTE* pbData,
DWORD* pdwDataLen);

The CPDecrypt function decrypts data previously encrypted with the CPEncrypt function. Optionally, the application can specify that the decrypted data be hashed.
CPDeriveKey
BOOL CPDeriveKey(
HCRYPTPROV hProv,
ALGID Algid,
HCRYPTHASH hBaseData,
DWORD dwFlags,
HCRYPTKEY* phkey);

The CPDeriveKey function generates a cryptographic session key using a hash of base data. This function guarantees that all keys generated from the same base data using the same algorithms are identical. The base data can be a password or other user-supplied data.
CPDestroyHash
BOOL CPDestroyHash(
HCRYPTPROV hProv,
HCRYPTHASH hHash);

The CPDestroyHash function destroys the hash object referenced by the hHash parameter.
CPDestroyKey
BOOL CPDestroyKey(
HCRYPTPROV hProv,
HCRYPTKEY hkey);

The CPDestroyKey function releases the handle referenced by the hkey parameter. After a key handle has been released, it becomes invalid and can no longer be used.
CPEncrypt
BOOL CPEncrypt(
HCRYPTPROV hProv,
HCRYPTKEY hkey,
HCRYPTHASH hHash,
BOOL Final,
D WORD dwFlags,
BYTE* pbData,
DWORD* pdwDataLen,
D WORD dwBufLen);

The CPEncrypt function encrypts data. Optionally, the application can specify that a hash of the plaintext data is to be generated.
CPExportKey
BOOL CPExportKey(
HCRYPTPROV hProv,
HCRYPTKEY hkey,
HCRYPTKEYh PubKey,
D WORD dwBlobType,
DWORD dwFlags,
BYTE* pbData,
DWORD* pdwDataLen);

The CPExportKey function securely exports cryptographic keys from a CSR's key container.
CPGenKey
BOOL CPGenKey(
HCRYPTPROV hProv,
ALGID Algid,
DWORD dwFlags,
HCRYPTKEY* phKey);

The CPGenKey function generates a random cryptographic key or key pair.
CPGenRandom
BOOL CPGenRandom(
HCRYPTPROV hProv,
DWORD dwLen,
BYTE* pbBuffer);

The CPGenRandom function fills a buffer with random bytes.
CPGetHashParam
BOOL CPGetHashParam(
HCRYPTPROV hProv,
HCRYPTHASH hHash,
DWORD dwParam,
BYTE* pbData,
DWORD* pdwDataLen,
DWORD dwFlags);

The CPGetHashParam function retrieves data about the operations of a hash object. The actual hash value can be obtained using this function.
CPGetKeyParam
BOOL CPGetKeyParam(
HCRYPTPROV hProv,
HCRYPTKEY hkey,
DWORD dwParam,
BYTE* pbData,
DWORD* pdwDataLen,
DWORD dwFlags);

The CPGetKeyParam function retrieves data that governs the operations of a key.
CPGetProvParam
BOOL CPGetProvParam(
HCRYPTPROV hProv,
DWORD dwParam,
BYTE* pbData,
DWORD* pdwDataLen,
DWORD dwFlags);

The CPGetProvParam function returns data about a cryptographic service provider (CSP).
CPGetUserKey
BOOL CPGetUserKey(
HCRYPTPROV hProv,
DWORD dwKeySpec,
HCRYPTKEY* phUserKey); The CPGetUserKey function retrieves the handle of one of the permanent key pairs in the hProv key container.
CPHashData
BOOL CPHashData(
HCRYPTPROV hProv,
HCRYPTHASH hHash,
const BYTE* pbData,
DWORD dwDataLen,
DWORD dwFlags);

The CPHashData function feeds data into a specified hash object.
CPHashSessionKey
BOOL CPHashSessionKey(
HCRYPTPROV hProv,
HCRYPTHASH hHash,
HCRYPTKEY hkey,
DWORD dwFlags);

The CPHashSessionKey function feeds a cryptographic key to a specified hash object. This allows a key to be hashed without the application having access to the key material.
CPImportKey
BOOL CPImportKey(
HCRYPTPROV hProv,
const BYTE* pbData,
DWORD dwDataLen,
HCRYPTKEYh PubKey,
DWORD dwFlags,
HCRYPTKEY* phkey);

The CPImportKey function transfers a cryptographic key from a key BLOB to a CSP key container.
CPReleaseContext
BOOL CPReleaseContext(
HCRYPTPROV hProv,
DWORD dwFlags);

The CPReleaseContext function releases a context created by CPAcquireContext.
CPSetHashParam
BOOL CPSetHashParam(
HCRYPTPROV hProv,
HCRYPTHASH hHash,
DWORD dwParam,
BYTE* pbData, DWORD dwFlags); The CPSetHashParam function customizes the operations of a hash object.
CPSetKeyParam
BOOL CPSetKeyParam (
HCRYPTPROV hProv,
HCRYPTKEY hkey,
DWORD dwParam,
BYTE*pbData,
DWORD dwFlags);

The CPSetKeyParam function customizes the operations of a key.
CPSetProvParam
BOOL CPSetProvParam(
HCRYPTPROV hProv,
DWORD dwParam,
BYTE* pbData,
DWORD dwFlags);

The CPSetProvPararn function customizes the operations of a cryptographic service provider (CSP).
CPSignHash
BOOL CPSignHash(
HCRYPTPROV hProv,
HCRYPTHASH hHash,
DWORD dwKeySpec,
LPCWSTR sDescription,
DWORD dwFlags,
BYTE* pbsignature,
DWORD* pdwSigLen);

The CPSignHash function signs a hash object.
CPVerifySignature
BOOL CPVerifySignature(
HCRYPTPROV hProv,
HCRYPTHASH hHash,
coast BYTE* phSignature,
DWORD dwSigLen,
HCRYPTKEY hPubKey,
LPCWSTR sDescription, DWORD dwFlags); The CPVerifySignature function verifies the digital signature.

Part of creating a CSP is providing for its installation. At a minimum, a CSP must include a setup program that:
    Copies the CSP DLL to a directory pointed to by the PATH environment variable,
    Creates the appropriate registry entries, namely registering the CSP, A CSP is registered under the following registry key:
HKEY_LOCAL_MACHINE SOFTWARE
Microsoft
Cryptography
Defaults
Provider
    The following registry entries under the above hKey register the CSP with the operating system.
<CSP name>
>Image Path:REG_SZ:<CSP DLL name>
>Signature:REG_BINARY:<digital signature>
>Type:REG_DWORD:<CSP type>
The <CSP name> entry is the text name of the CSP.
The <CSP DLL name> (Image Path) entry is the name of the CSP DLL. If a fully qualified path, such as C:\Myx\Rsabase.clll is specified, the CSP DLL need not be placed in a directory pointed to by the PATH environment variable.

The <digital signature> (Signature) entry is the digital signature file for the CSP DLL. This signature file can he either the debug signature created with the Sign.exe utility or the release signature obtained from Microsoft. Beginning with Windows 2000, the signature can be in a resource within the CSP.

The <CSP type> entry is in decimal format and exactly 3 digits in length. For example, if the CSP type is 25, the key name is Type 025.
Setting the Machine Default CSP,
    One machine default CSP can be specified for each CSP type. The machine default CSP is used if an application calls CryptAcquireContext with only a CSP type specified and no user default CSP registry entry exists.
    Unless there are important reasons for setting up a custom CSP as the machine default CSP, the normal default CSP should not be changed. If a custom CSP must be used, the setup program can install its CSP as the machine default. If the normal default is to be changed, the following registry entry sets the machine default CSP:
HKEY_LOCAL_MACHINE
SOFTWARE Microsoft
Cryptography Defaults
Provider Type
Type
<CSP type>
>Name:REG SZ:<CSP name>

The <CSP type> entry is in decimal format and exactly 3 digits in length. For example, if the CSP type is 25, the key name is Type 025.

The <CSP Name> entry must be set to the textual name of the CSP. This must exactly match the <CSP Name> registry key discussed in above.

And setting the User Default CSP.

One user default CSP can be specified for each CSP type. The user default CSP is used when an application calls CryptAcquireContext with only a CSP type specified.

Unless there are important reasons for setting up a custom CSP as the user default CSP, the normal default CSP should not be changed. If the user default CSP must be changed, user defaults are stored in the registry's HKEY_CURRENT_USER window and can only be set if the actual end user is currently logged on to the computer. In any case, the end user should be consulted or informed whenever the user default CSP is changed. The user default CSP is set using the CryptSetProvider function, which internally sets the following registry entry:

HKEY_CURRENT USER
Software
Microsoft
Cryptography
Provider Type
<CSP type>
>Name:REG SZ:<CSP name>

The <CSP type> entry is in decimal format and exactly 3 digits in length. For example, if the CSP type is 25, the key name is Type 025.

The <CSP name> entry must be set to the textual name of the CSP. This must exactly match the <CSP name> registry key discussed in above.

Profile Virtualization

Another aspect of our invention is profile virtualization. Profile virtualization consists in getting all information related to user, storing them in the companion file and loading them on the guest computer.

In the case of gathering companion information all user-related information is usually stored in a specific folder. Under Windows 2000, this folder is usually located in the folder "Documents and Settings". Directly copying these files is not always possible especially if the user is currently loaded. Indeed, in this case, files may be locked. For instance, this is the case of the file ntuser.dat, which is the registry file of the user. To be able to copy this file, an application should call the window registry API RegsaveKey. This function saves the specified key and all of its subkeys and values to a new file.

LONG RegSaveKey(
HKEY hKey, //handle to key
LPCTSTR lpFile, //data file
LPSECURITY_ATTRIBUTES lpSecurityAttributes); II SD To be properly used, special attention should be put to the security attributes which must be properly set. To accomplish this, the OpenProcessToken function can be used to open the access token associated with a process. The AcljustTokenPrivileges function enables or disables privileges in the specified access token. Enabling or disabling privileges in an access token requires TOKEN_ADJUST_PRIVILEGES access.

BOOL OpenProcessToken(
HANDLE ProcessHandle,
DWORD DesiredAccess,
PHANDLE TokenHandle);
BOOL AdjustTokenPrivileges(
HANDLE Token Handle,
BOOL DisableAllPrivileges,
PTOKEN PRIVILEGES NewState,
DWORD BufferLength,
PTOKEN_PRIVILEGES PreviousState,
PDWORD ReturnLength);

To load the profile on a guest computer, the current user should be logged off. This is achieved by a call to the ExitWindowEx API.

BOOL ExitWindowsEx(
UINT uFlags, //shutdown operation
DWORD dwReason); //shutdown reason The ExitWindowsEx function either logs off the current user, shuts down the system, or shuts down and restarts the system. It sends the WM_QUERYENDSESSION message to all applications to determine if they can be terminated.

To avoid any interaction with the current user, a new account is created on the computer. This account is automatically loaded by programmatically editing the registry:

HKEY_LOCAL_MACHINE
SOFTWARE
Microsoft
Windows NT
CurrentVersion
Winlogon
> DefaultDomainName:REG SZ:<Name of the local machine>
> DefaultUserName:REG SZ:<username of the new account>
> DefaultPassword:REG_SZ:<password of the new account>> AutoAdminLogon:DWORD: 1

Last, the path of the user-data folder should be edited in the registry:

HKEY_LOCAL_MACHINE
SOFTWARE
Microsoft
CurrentVersion
ProfileList
<SID of the new account>
> ProfileImagePath:REG_EXPAND_SZ:<Name of the local machine>

The SID (security identifier) is actually the unique value of variable length used to identify a trustee. Each account has a unique SID issued by an authority, such as a Windows domain controller, and stored in a security database. This SID can be get back through with the LookupAccountName function that accepts the name of a system and an account as input and retrieves the SID for the account and the name of the domain on which the account was found.

BOOL LookupAccountName(
LPCTSTR lpSystemName,
LPCTSTR lpAccountName,
PSID Sid,
LPDWORD cbSid,
LPTSTR DomainName,
LPDWORD cbDomainName,
PSID_NAME USE peUse);

It has to be pointed out that it is not possible to change the user-data folder the first time the account is created. To bypass this constraint, it is possible to create the account, log in, immediately log off, change the user-data folder path and log in again.

The method described in the paragraph above can be enhanced for side by side sessions by loading the new account side-by-side the current user. This can be achieved by replacing the MSGina.dll of Windows.

The interactive logon procedure is normally controlled by Winlogon, MSGina.dll and network providers. To alter the interactive logon procedure, MSGina.dll can be replaced with a customized GINA DLL. The GINA DLL operates in the context of the Winlogon process and, as such, the GINA DLL is loaded very early in the boot process. The GINA DLL must follow rules so that the integrity of the system is maintained, particularly with respect to interaction with the user. The purpose of a GINA DLL is to provide customizable user identification and authentication procedures. The default GINA DLL does this by delegating SAS event monitoring to Winlogon, which receives and processes CTL+ALT+DEL secure attention sequences (SASs). A custom GINA is responsible for setting itself up to receive SAS events (other than the default CTRL+ALT+DEL SAS event), and notifying Winlogon when SAS events occur. Winlogon will evaluate its state to determine what is required to process the custom GINA's SAS. This processing usually includes calls to the GINA's SAS processing functions.

GINA DLL exports the following functions:
WixActivateUserShell: Activates the user shell program.
WlxDisplayLockedNotice: Allows the GINA DLL to display lock information,
WlxDisplaySASNotice: Winlogon calls this function when no user is logged on.
WlxDisplayStatusMessage: Winlogon calls this function with a status message to display.
WlxGetConsoleSwitchCredentials: Winlogon calls this function to read the currently logged on user's credentials to transparently transfer them to a target session,
WlxGetStatusMessage Winlogon calls this function to get the current status message.
WlxInitialize: Initializes the GINA DLL for a specific window station.
WlixlsLockOk. Verifies that workstation lock is okay.
WlxlslogoffOlc Verifies that logoff is okay.
WlxLoggedOnSAS: Winlogon calls this function when it receives a secure attention sequence (SAS) event while the user is logged on and the workstation is not locked.
WlxLoggedOutSAS: Winlogon calls this function when it receives an SAS event while no user is logged on.
WixLogoff: Notifies the GINA DLL that a logoff operation was requested.
WlxNegotiate: Indicates whether the current version of Winlogon can be used with the GINA DLL.
WlxNetworkProviderLoad: Winlogon calls this function after it loads a network provider to collect valid authentication and identification information.
WIxRemoveStatusMessage: Winlogon calls this function to tell the GINA DLL to .stop displaying the status message.
WlxScreensaverNotify: Allows the GINA to interact with the screen saver operation.
WlxShutdown: Winlogon calls this function just before shutting down, allowing the GINA to perform any shutdown tasks, such as ejecting a smart card from a reader.
WlxStartApplication: Winlogon calls this function when the system needs an application started in the user's context.
WlxWkstaLockedSAS: Winlogon calls this function when it receives an SAS while the workstation is locked.

Loading another user side by side to the current user can be achieved in the WlxLoggedOnSAS. The WlxCreateUserDesktop and WlxSetReturnDesktop. The WlxSetReturnDesktop function is called by GINA to specify the alternate application desktop that Winlogon will switch to when the current SAS event processing function is complete. The WlxCreateUserDesktop function is called by GINA to create alternate application desktops for the user.

Bool WlxSetReturnDesktop(
HANDLE hW1x,
PWLX_DESKTOP pDesktop);
Boo/WlxCreateUserDesktop(
HANDLE hW 1x,
HANDLE hToken,
DWORD Flags,
PWSTR pszDesktopName,
PWLXDESKTOP* ppDesktop);

Virtual Disk

The method, system, apparatus, and program product described herein creates the concept of a virtual disk. All information, all user-related data that is part from the concept is actually written to a virtual disk, which is the software representation of a hard disk inside a unique file.

The method, system, program product, and apparatus implement a storage driver, enabling it to link to the virtual hard disk which is physically the companion file.

The Virtual Secure Desktop has been designed to provide the user with a completely secure working environment. The safety features cover the writing of data to the computer's hard drive.

Processes and application running within the Virtual Desktop cannot write the user data to the computer's hard drive. Instead, they will have to write their data to a secure location, which is an encrypted disk space contained within a unique file. This secure location is called the secure vault and can he located either on the local hard disk or on a removable device.

Inside this secure vault, data is encrypted and decrypted on the fly as it is written or read from the Virtual Secure Desktop's secure vault. No user data is written in a non-protected way to the hard disk. As a result, reading data written from the Virtual Secure Desktop requires proper authentication and access to the secure vault.

The Virtual Secure Desktop uses strong encryption algorithms and technology such as the triple-DES algorithm. The Data Encryption Standard (DES) was developed by an IBM team around 1974 and adopted as a national standard in 1977: Triple DES is a minor variation of this standard. It takes three 56-bit keys, for an overall key length of 168 bits. The procedure for encryption is exactly the same as regular DES, but it is repeated three times. Hence the name Triple DES. The data is encrypted with the first key, decrypted with the second key, and finally encrypted again with the third key, For the foreseeable future Triple DES is an excellent and reliable choice for the security needs of highly sensitive information. Triple DES is not 3 times as strong as DES, it is at least 256 times stronger than DES.

Technically, the vault access is achieved by installing a driver that will intercept all read and write access to the native disk. Before writing to or reading from the hard-disk, the piece of data is encrypted or decrypted. Many papers have been written on this subject and explain how to achieve this (Framework for implementing File Systems in Windows NT by Danilo Almeida—Massachusetts Institute of Technology May 1998 or Creating user-mode device drivers with a Proxy by Galen C. Hunt—Department of Computer Science, University of Rochester).

More precisely, WDM Windows NT device drivers use IRPs as a messaging and data transfer vehicle. The Windows® Driver Model (WDM), which defines a common architecture for Windows 98 and Windows 2000 device drivers, inherits a lot from the old Windows NT® device driver model.

As messages are the lifeblood of Windows-based applications, IRPs are the lifeblood of WDM drivers. In WDM, all I/O is potentially asynchronous. The function used to initiate the I/O does not necessarily return the result of the I/O; instead, the result may be returned via a completion function. A device driver architecture usually evolves into a driver stack, a sequence of device drivers each specializing on the features of the lower driver. An IRP is a kernel or driver-allocated structure representing a single I/O action. The I/O-initiating driver initializes the IRP with the request type, optional completion routine, and input/output buffer for the action. It then passes a pointer to the IRP down the driver stack. Upon receiving an IRP, a driver may do one of the following tasks:

Satisfy the I/O and complete the IRP with a successful status

Complete the IRP with an error status

Pass the IRP to a lower driver

Queue the IRP, to be completed or passed down at a later time

In any event, a well-behaved WDM driver never blocks or polls to satisfy an IRP. This is essential if Windows is to be continuously responsive and always preemptible. Some time after the I/O is initiated, a lower driver completes the IRP. The kernel calls each driver's completion routine with a pointer to the IRP. Thus, the IRP traverses back up the driver stack until the top-level driver's completion routine gets either a result or an error status. When accessing the virtual disk, our driver satisfies the I/O and complete the IRP with a successful status. When it is accessing the current hard-disk, our driver Passes the IRP to a lower storage driver.

To install a driver in the stack of drivers, Windows needs to be rebooted. To avoid this annoying procedure for the user, a workaround has been implemented. It consists in developing a system service, which creates a named pipe and listens to all the IRP in relation with I/0. Hence, the driver can intercept the IRP and potentially complete it without being normally installed in the storage driver stack.

Compression feature can be added by implementing a driver for this virtual disk, it is possible to intercept the data before it is physically written to the disk and just after it has been read from the disk. By handling the data at the lowest level, it is possible to add valuable features like compression.

Privilege Granting

Another design issue is privilege granting. Starting with Windows 2000, Microsoft has developed a security feature limiting the rights of a user or an application on a computer based on access right credentials.

To fully be functional, the "My Companion" software needs the "power user" rights. So, in the case "My Companion" software is run by a user not granted with this level of access rights, it will not run properly and some problems may occur.

To avoid this situation, the "My Companion" method, system, program product, and apparatus incorporates a feature to grant the required rights for the "My Companion" software, regardless of the rights the current user has.

The first time the "My Companion" software is run by a user that has more restrictive rights restrictive than the minimum required by the "My Companion" application, the software creates a specific user account that will have all the required rights. A service is then installed on the operating system with the automatic start feature enabled. This service is run by this specific account.

Then, when the program is run and regardless of the rights that are granted to the then currently logged user the "My Companion" software are able to run properly.

Whenever a task requires less restrictive rights than the ones of the current user, a RPC (remote procedure call) communication is established between the application and the service. This communication enables the application to tell the service which action should be accomplished. Once done by the service, the application is notified of the success or failure of the request. As a result of this process, the application has been allowed to accomplish a task even if it did not initially have the rights to properly do so.

Writing a system service logged with a user account is pretty common. Many examples can he found in the Platform SDI< from Microsoft: "My Companion" provides communication between the service and an application run by the current user. This is achieved by implementing a RPC protocol through a named pipe. A pipe is a section of shared memory that processes use for communication. The process that creates a pipe is the pipe server. A process that connects to a pipe is a pipe client. One process writes information to the pipe, then the other process reads the information from the pipe. This overview describes how to create, manage, and use pipes.

There are two types of pipes: anonymous pipes and named pipes. Anonymous pipes require less overhead than named pipes, but offer limited services. Our solution implements a named pipe.

The term pipe, as used here, implies that a pipe is used as an information conduit. Conceptually, a pipe has two ends. A one-way pipe allows the process at one end to write to the pipe, and allows the process at the other end to read from the pipe, A twoway (or duplex) pipe allows a process to read and write from its end of the pipe.

A named pipe is a named, one-way or duplex pipe for communication between the pipe server and one or more pipe clients. All instances of a named pipe share the same pipe name, but each instance has its own buffers and handles, and provides a separate conduit for client-server communication. The use of instances enables multiple pipe clients to use the same named pipe simultaneously.

Any process can access named pipes, subject to security checks, making named pipes an easy form of communication between related or unrelated processes. Named pipes can be used to provide communication between processes on the same computer or between processes on different computers across a network.

Any process can act as both a server and a client, making peer-to-peer communication possible. As used here, the term pipe server refers to a process that creates a named pipe, and the term pipe client refers to a process that connects to an instance of a named pipe.

Basically, the pipe is opened by the CreateNamedPipe function that creates an instance of a named pipe and returns a handle for subsequent pipe operations. A named pipe server process uses this function either to create the first instance of a specific named pipe and establish its basic attributes or to create a new instance of an existing named pipe.

```
HANDLE CreateNamedPipe(
    LPCTSTR IpName, //pipe name
    DWORD dwOpenMode, //pipe open mode
    DWORD dwPipeMode, //pipe-specific modes
    DWORD nMaxlnstances, //maximum number of instances
```

```
-continued

DWORD nOutBufferSize, //output buffer size
    DWORD nInBufferSize, //input buffer size
    DWORD nDefaultTimeOut, // time-out interval
    LPSECURITY ATTRIBUTES IpSecurityAttributes); //SD
```

Then both the service and the application listen to the newly-created pipe through the function TransactNamedPipe:

```
    BOOL TransactNamedPipe(
    HANDLE hNamedPipe, //handle to named pipe
    LPVOID IpinBuffer, // write buffer
    DWORD nInBufferSize, //size of write buffer
    LPVOID IpOutBuffer, //read buffer
    DWORD nOutBufferSize, //size of read buffer
    LPDWORD IpBytesRead, //bytes read
    LPOVERLAPPF_D IpOverlapped //overlapped structure
    );
```

The TransactNameclPipe function combines the functions that write a message to and read a message from the specified named pipe into a single network operation.

The following examples are illustrative of the apparatus, method, system, and program product of the invention.

Illustrative Examples—Working Environment

Maurice is a consultant with an international management consulting company. His company has offices in most key economic countries, offering strategy consultancy mainly to large multinational companies. Maurice works on short-term projects of an average of 3 months, usually changing client and sometimes country from one project to another. Maurice is based in the Paris office but is assigned to projects by a central coordinator for Europe as a whole.

Maurice usually works in his own offices, whether in Paris or in the country he is assigned to. He will meet his client most probably once-or twice a week for a few hours at the client's premises and he will most probably travel for working purposes to interview or meet people around the country once or twice a week.

His company offers same IT services throughout the world. So Maurice and his colleagues on a same project use same equipment and Maurice is familiar with working environment in his office and elsewhere.

The projects Maurice works on are important for his clients and mostly secret. His work is intellectual content provided to clients and must not be left anywhere not required. Security is a concern for Maurice.

Along with his colleagues, they work long hours and are used to seek efficiency.

IT Equipment and Usage

Maurice spends long hours working, most of his time being spend working on his laptop. He uses a limited set of software installed on his computer: Microsoft Office and Lotus Notes. The first is used to build presentations and documents that are the output of his work and the second is used to transfer and share this intellectual content (email and knowledge databases).

Laptops are standard across the firm, run Microsoft Windows and have network configuration allowing Maurice to reach the network services (email, knowledge database, internet connection and shared drives) from any office or any phone line throughout the world.

Maurice might have a PDA which he would have installed himself on his computer, as there are no restrictions. As the PDA desktop, Maurice can install any software but does not have any support from his IT department on issues related to that software. Maurice is not a sophisticated computer user. He does not think of saving his data or doing any preventive action. He works on his computer and would not complain unless his tool crashes and cannot be used anymore.

If his computer is changed or send to be repaired, he will lose all personal and professional files that were not backed-up (i.e. all of them!) and any software he might have installed himself.

Maurice needs easy to use and reliable equipment he can use anywhere as he might be required to work in taxi or on a plane.

Consumer Expectations and Beliefs

Maurice has limited time and is not used to hitting a wall several times as this increases his stress level. He will be reluctant to invest time or continue investing time in getting familiar with any new item, although he would love to be an early adopter of any new technology. For instance, although he might have a FDA for more than a year, he might not know he could connect with infrared to his computer.

Maurice travels a lot and so is reluctant in having too many things with himself, although it seems his computer bag is an extension to his own arm and follows him everywhere.

Maurice will be sensible to issues that impact his work or his ability to deliver his work. He will complain about the printer only if the latter is out of service at 3:00 am when he needs to print a presentation for an 8:00 am meeting. He will get interested in how to get the color acetates out of the printer, only when he is ready to do so and needs to do so. And usually the first time such situation happens to him is again at 3:00 am, when there is no helpdesk to help him. He will start looking into zip drives as a way to transfer the information the day his network connection does not work and needs to send a document to his client.

Illustrative Example—an Auditor

John is an auditor for a prestigious international audit firm. The firm has offices all around the globe and addresses the needs of corporations big and small. In many cases the needs of the large corporations span across several offices, and John and his team who are assigned to various customers, will need to be able to work in different locations.

Typically, John will work from his office in the Paris location. He will also have to work in other offices of the firm and directly at customer sites as required by the various missions he has been staffed on. As most other auditors, John will also take some work home from time to time.

The Auditor's Equipment

The firm has equipped John with a standard laptop. John's laptop is a standard issue that includes all the software applications he will need for his work as well as proper networking configuration so that he can connect when in his office or remotely through dial-up.

John's laptop runs a recent Microsoft Windows operating system along with the Microsoft Office suite and a Lotus Notes client. John also uses a couple of custom application developed internally by his firm.

For management reasons, John's credentials do not allow him to install another piece of software (limited Windows user rights). The software environment is a standard corporate-mandated one. To modify any configuration or install other software on his laptop, he will need to contact the IT department.

The Auditor at the Office

When John is in his office, he simply docks is laptop and gains network connectivity to the rest of his corporate intranet and the Internet. He is therefore able to download his email and access the corporate databases through the Lotus Notes client.

He can work on office documents and store them either on his laptop's hard drive or on his network-shared drive. He can also print his documents at leisure.

John recently purchased a personal Palm handheld device. He has installed the desktop application on his home computer. But, he would like to install the Palm Desktop application at work as well. To do that, he will need to put in a request with the corporate IT department. Upon approval of his request, his laptop will have to be sent to them for installation. This will mean a minimum immobilization of 24 hours.

Using My Companion, John could have installed the Palm Desktop application directly as a virtual software on the device. As a result, he could access the Palm desktop application from any computer where he plugs his "My Companion" device. This would avoid a complete IT request, approval and immobilization cycle.

Working in a Different Office

When John is traveling to remote Office, he will bring his laptop along with him. He will be able to use some desk space and work on his documents directly on his laptop. However the network is no longer the same and John is not able to simply plug is laptop into the network. Therefore, he no longer has seamless access to his email and other groupware functions and he cannot print documents anymore either.

To get access to his email, he will have to use a dial up line and connect to a dial-up number (if available in the geography he is traveling to) and access his email at modem speeds.

Printing is a whole different issue, it is a real nightmare! John has to continuously struggle with this problem. For small documents, he can put them on a floppy (when he has thought ahead to take his floppy drive with him) and ask someone from the local office to do it for him. Sometimes, he will also carry a small bubble jet printer with him to the remote site but it is such a hassle. The last resort option is for him to email the document someone and keep in mind he will do it at modem speeds.

However, by using My Companion, John would be able to use any computer at the remote Office and plug directly in it. He would instantly gain access to the network because that machine is on the corporate intranet. He would therefore be able to download his email or access other network functionality at high-speed connection rates rather than modem. He will also be able to use the printers as configured on the host machine.

My Companion will not replace the need for the laptop but allows John to work in a more efficient way. He will still be able to use his laptop and work on his documents on the way to this remote location or even at the remote location if he wants to work offline but connecting and synchronizing documents and data will be a snap with My Companion.

At a Customer Site

When John is working on site at the customer's location, he is in a completely foreign location from an IT and networking infrastructure perspective. He has no idea of what he will find their and how, if at all possible, he will be able to connect his machine to a network.

At best, he and his colleagues are given an empty office where they can settle and install their laptops and anything else they would need for their work environment. There is therefore a completely isolated island within the customer's premises. To connect back to the home office, they will need to use dial-up lines from either the customer site (if possible) or from their hotel room. Printing will be an issue as well—very much like in the previous case.

Using My Companion, they are able to borrow a machine from the customer that is connected to the network. They would then be able to securely connect to their own network using the device's encryption and VPN capabilities. Nothing on the customer's machine will need to be reconfigured in order to allow this. Also, all of John's data will remain on the device and therefore none of that will be left on the customer's machine. To further reinforce security, "My Companion" allows John to securely browse the Internet by keeping the browser's cache on the "My Companion" device rather than the customer's machine.

When the Laptop Crashes

In the unfortunate yet fairly common case of a computer crash, John will have to send his laptop to his own office's IT department. They will try to fix his problem or reinstall the software environment and then ship it back to him. In the event John is out of its office and at a remote location, shipping time to and from the main office will have to be factored into the down time. At best, John will be out of the equipment for 24 hours. At worst, it will be several days. In all cases this down time will be expensive to his firm.

Using "My Companion" to store and synchronize personal data, the firm's IT department would be able to provide John with a hot swap: while he sends the laptop back for repair they can send him out a replacement unit that has the corporate software environment and on which he will simply plug his device to have access to all his data files.

Although essential to his work, the laptop will become a commodity piece of equipment for John. Corporations will be able to better manage their computing infrastructure, much like they would with a fleet of cars where any employee could take any car and still have the benefit of transportation without being tied to a specific vehicle.

The above illustrative examples show certain issues solved by the method, system, apparatus, and program product of our invention. Specifically illustrated are:

Making sure data is properly and seamlessly hacked up when he is in the office

Access to the Intranet when traveling to foreign offices or at customer sites

Ability to print when traveling to foreign offices or at customer sites

Access to the proper Email interface when traveling (secure VPN authentication on shared computers)

Work disruption when computer equipment needs maintenance

Ability to install and access personal information manager

While the invention has been described with respect to certain preferred embodiments and exemplifications, it is not intended to limit the scope of the invention thereby, but solely by the claims appended hereto.

We claim:

1. A computer readable medium having stored therein computer executable instructions, which when executed are operable to:
   transfer data relating to a work environment on a first computer system to a memory device that is communicatively coupled to the first computer system;
   create an install file for overseeing re-creating the work environment on a computer system other than the first computer system;
   copy the install file from the first computer system to the memory device;
   wherein the install file, when executed, is operable to:
      transmit at least a portion of the data relating to the first computer system from the memory device to a target computer system; and
      modify settings on the target computer in response to the data transmitted to the target computer system to re-create the work environment on the target computer system.

2. The computer readable medium of claim 1, wherein the memory device is a persistent memory device.

3. The computer readable medium of claim 1, wherein the computer executable instructions, which when executed are operable to transfer data relating to the work environment, are operable when executed to transfer data files associated with the work environment to the memory device.

4. The computer readable medium of claim 1, wherein the computer executable instructions, which when executed are operable to transfer data relating to the work environment, are operable when executed to transfer project files associated with the work environment to the memory device.

5. The computer readable medium of claim 1, wherein the computer executable instructions, which when executed are operable to transfer data relating to the work environment, are operable when executed to transfer an application program associated with the work environment to the memory device.

6. The computer readable medium of claim 5, wherein when executed the computer executable instructions are further operable to:
   monitor an installation process of the application program on the first computer system, wherein the monitoring comprises tracking locations on said first computer system of one or more executable files associated with the application program and information to facilitate execution of the application program on a computer system other than said first computer system.

7. The computer readable medium of claim 6, wherein the computer executable instructions, which when executed are operable to transfer data relating to the work environment, are operable when executed to transfer the one or more executable files associated with the application program and the information to facilitate execution of the application program.

8. A persistent memory device having stored therein computer executable instructions, which when executed are operable to:
   transfer data relating to a work environment on a first computer system to the persistent memory device;
   create an install file for overseeing re-creating the work environment on a computer system other than the first computer system;
   copy the install file from the first computer system to the persistent memory device;
   wherein the install file, when executed, is operable to:
      transmit at least a portion of the data relating to the first computer system from the persistent memory device to a target computer system; and
      modify settings on the target computer in response to the data transmitted to the target computer system to recreate the work environment on the target computer system.

9. The persistent memory device of claim 8, wherein the computer executable instructions, which when executed are operable to transfer data relating to the work environment, are operable when executed to transfer data files associated with the work environment to the persistent memory device.

10. The persistent memory device of claim 8, wherein the computer executable instructions, which when executed are operable to transfer data relating to the work environment, are operable when executed to transfer project files associated with the work environment to the persistent memory device.

11. The persistent memory device of claim 8, wherein the computer executable instructions, which when executed are operable to transfer data relating to the work environment, are operable when executed to transfer an application program associated with the work environment to the persistent memory device.

12. The persistent memory device of claim 11, wherein when executed the computer executable instructions are further operable to:
   monitor an installation process of the application program on the first computer system, wherein the monitoring comprises tracking locations on said first computer system of one or more executable files associated with the application program and information to facilitate execution of the application program on a computer system other than said first computer system.

13. The persistent memory device of claim 12, wherein the computer executable instructions, which when executed are operable to transfer data relating to the work environment, are operable when executed to transfer the one or more executable files associated with the application program and the information to facilitate execution of the application program.

14. A method comprising:
   storing data relating to a work environment on a first computer system to a persistent memory device;
   creating an install file for overseeing re-creating the work environment on a computer system other than the first computer system;
   copying the install file from the first computer system to the persistent memory device;
   wherein the install file is operable, when the persistent memory device is communicatively coupled to the target computer system, to:
      transmit at least a portion of the data relating to the first computer system from the persistent memory device to the target computer system; and
      modify settings on the target computer in response to the data transmitted to the target computer system to recreate the work environment on the target computer system.

15. The method of claim 14, further comprising:
   under direction of the install file, transmitting a portion of the data relating to the first computer from the persistent memory device to the target computer; and
   modifying settings on the target computer in response to the transmitted data.

16. The method of claim 14, wherein transferring data relating to the work environment comprises transferring data files associated with the work environment.

17. The method of claim 14, wherein transferring data relating to the work environment comprises transferring project files associated with the work environment to the memory device.

18. The method of claim 14, wherein transferring data relating to the work environment comprises transferring an application program associated with the work environment to the memory device.

19. The method of claim 18, wherein the method further comprises:

monitoring an installation process of the application program on the first computer system, wherein the monitoring comprises tracking locations on said first computer system of one or more executable files associated with the application program and information to facilitate execution of the application program on a computer system other than said first computer system.

20. The method of claim 19, wherein the method further comprises:

creating a file that describes the locations of the one or more executable files associated with the application program and the information to facilitate execution of the application program.

\* \* \* \* \*